United States Patent [19]

Delafosse

[11] 4,224,106
[45] Sep. 23, 1980

[54] PLATE-TYPE NUCLEAR FUEL ELEMENT

[75] Inventor: Jacques Delafosse, Gif-sur-Yvette, France

[73] Assignee: Commissariat a l'Energie Atomique, Paris, France

[21] Appl. No.: 924,413

[22] Filed: Jul. 13, 1978

[30] Foreign Application Priority Data

Jul. 22, 1977 [FR] France .................. 77 22541

[51] Int. Cl.² .................................. G21C 3/18
[52] U.S. Cl. ............................. 176/75; 176/77
[58] Field of Search ................... 176/68, 75, 77

[56] References Cited

U.S. PATENT DOCUMENTS

| | | | |
|---|---|---|---|
| 2,996,443 | 8/1961 | Schaner | 176/75 |
| 3,071,526 | 1/1963 | Litt | 176/75 X |
| 3,212,178 | 10/1965 | Noakes | 176/68 X |
| 3,275,525 | 9/1966 | Bloomster et al. | 176/68 X |
| 3,422,523 | 1/1969 | Kling | 176/75 X |
| 3,586,746 | 6/1971 | Triggiani et al. | 176/68 X |
| 4,038,135 | 7/1977 | Bergougnoux et al. | 176/68 X |

*Primary Examiner*—Peter A. Nelson
*Attorney, Agent, or Firm*—Sughrue, Rothwell, Mion, Zinn and Macpeak

[57] ABSTRACT

The plate-type element is made up of a fuel core consisting of ceramic fuel wafers inserted in a lattice formed by a wire grid having low neutron-absorption characteristics, the shape and dimensions of each mesh of the grid being intended to correspond to those of each wafer. The grid is fitted in an outer frame and the fuel element is completed by top and bottom cladding plates.

6 Claims, 3 Drawing Figures

PLATE-TYPE NUCLEAR FUEL ELEMENT

This invention relates to a nuclear fuel element consisting of ceramic material and designed in the form of plates which are specially adapted to the conditions prevailing in light water reactors. The fissile ceramic material constituting the fuel elements is divided into a number of small plates or wafers each provided with a thin independent cladding of metal alloy, said wafers being aligned in a number of rows in such a manner as to occupy the entire surface of the fuel plate.

A fuel element of this type was described for example in U.S. Pat. No. 4,038,135 of July 26th, 1977 and results in particularly rugged and reliable designs. This fuel element is nevertheless subject to a disadvantage in that each fuel wafer has to be covered with thin metal foil which in turn calls for industrial developments of a somewhat complex nature.

Moreover, there are some specific applications of plate-type nuclear fuels in which it is particularly advantageous to utilize the fuel in the form of very thin plates and especially plates having a thickness of less than 2 mm. This is the case, for example, when it is desired to equip a pool-type reactor core with fuel plates having a U-235 enrichment of less than 8% as will be explained hereinafter. In point of fact, the techniques developed in U.S. Pat. No. 4,038,135 of July 26th, 1977 do not readily lend themselves to the production of a plate element of small thickness.

The present invention is precisely directed to a fuel element of small thickness which offers the advantage of permitting easier and more rapid industrial manufacture while at the same time retaining all the advantages attached to the plate-type nuclear fuel element disclosed in U.S. Pat. No. 4,038,135.

The fuel element in accordance with the present invention is distinguished by the fact that a lateral covering is provided for each fuel wafer by means of a grid of thin wires fitted within a frame and each mesh of said grid has the shape and dimensions of a fuel wafer in order to serve as a housing for one of these latter.

In accordance with another important characteristic feature of the present invention, the grid whose meshes serve to house the different fuel wafers of a fuel element is made up of thin wires of a metal having low neutron-absorption characteristics, said wires being on the one hand joined together by electric welding and on the other hand diffusion-bonded to the side plates and end plates constituting the frame proper as well as to the cladding plates.

In an advantageous alternative embodiment of the invention, the ends of the wires are welded to a framing wire which extends on all four sides of the grid.

In accordance with the invention, the wires constituting the grid have a circular cross-section of very small diameter which is preferably less than 2 mm and the grid meshes are preferably of either rectangular or square shape. The corresponding fuel wafers of the fuel element have a thickness which is within the range of 1 to 2 mm, for example, and is most commonly of the order of 1.5 mm.

In a preferred alternative embodiment of the invention, the wires of the grid are of Zircaloy, but the grid, the side plates and end plates as well as the cladding plates can also be formed either wholly or partly of aluminum or of an aluminum alloy such as AG. Composite solutions—with some parts of Zircaloy and others of aluminum or aluminum alloy—are also of interest.

A more complete understanding of the invention will in any case be gained from the following description of exemplified embodiments which will be given hereinafter by way of example but not in any limiting sense, reference being made to the accompanying drawings, wherein.

Figure 1:
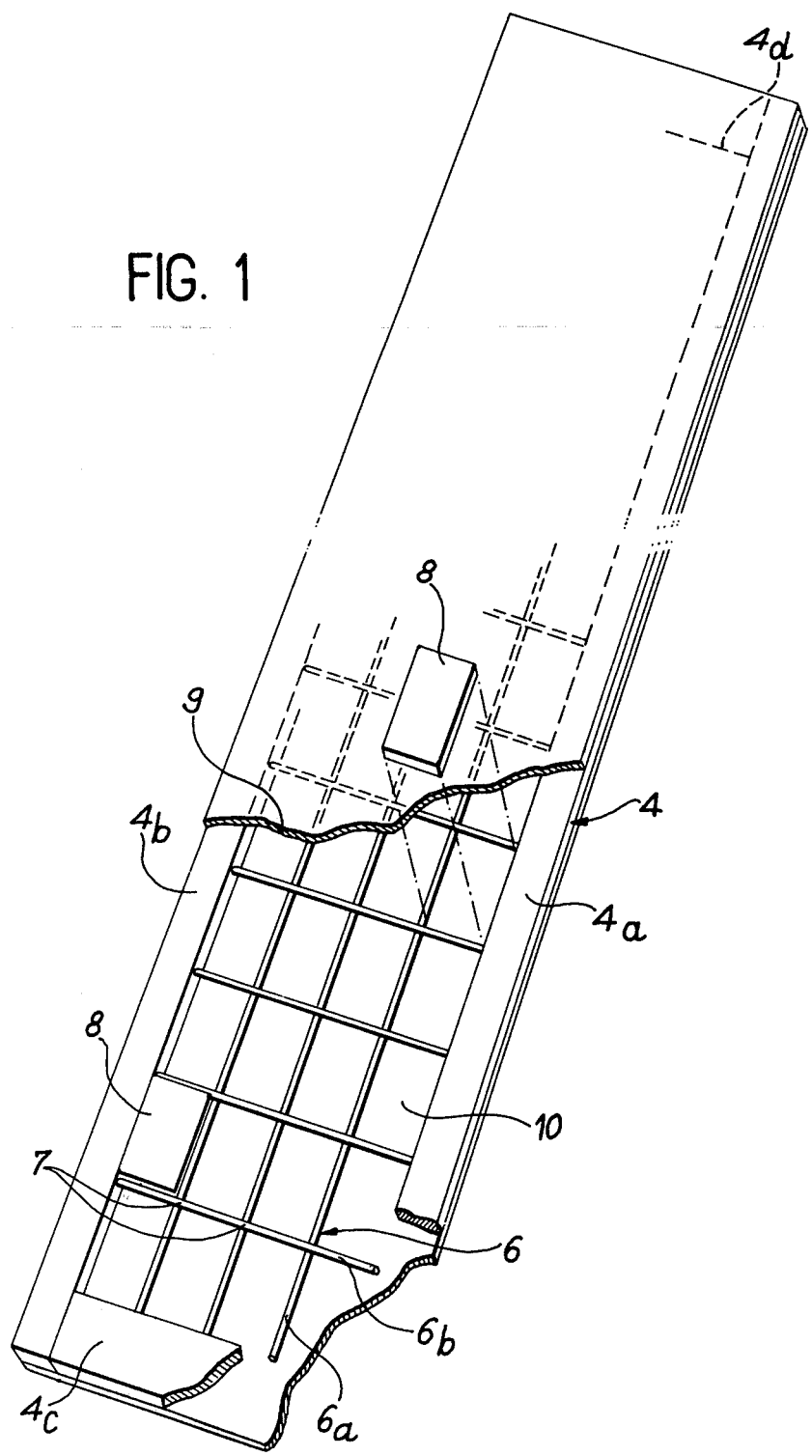
FIG. 1 is a partly exploded view of a platetype nuclear fuel element in accordance with the invention.

FIG. 1 shows the frame 4 in which the grid 6 is fitted. Said frame 4 comprises two side plates 4a and 4b as well as two end plates 4c and 4d.

In the example herein described, the grid 6 is constituted by two sets of thin wires 6a and 6b of Zircaloy which intersect at right angles and are joined together by electric welding at points such as those designated by the reference 7 so as to form a lattice in which the ceramic fuel wafers 8 of the fuel element are subsequently intended to be fitted. In the example shown in FIG. 1, the meshes of the lattice have a rectangular shape but could just as readily have a square shape for certain different applications.

The different wires 6a and 6b of the grid 6 have a diameter which is substantially equal to the thickness of the fuel wafers 8. Said wires are subjected first to electric welding under pressure in order to reduce over-thicknesses at each point of intersection 7, then to a trimming operation in order to ensure perfect calibration of the lattice openings. As a general rule, the different wafers of sintered fuel have a thickness within the range of 1 to 1.5 mm. The dimensions of each rectangular mesh are chosen so as to optimize ease of shaping at the moment of compression of each fuel wafer. By way of indication, good dimensions are of the order of 30×18 mm; as mentioned earlier, however, a square shape (17×17 mm, for example) appears to represent a particularly advantageous solution on technological grounds.

In accordance with the invention, the assembly formed by the grid 6 and the fuel wafers 8 is finally placed between a top cladding plate 9 and a bottom cladding plate 10.

Figure 2:
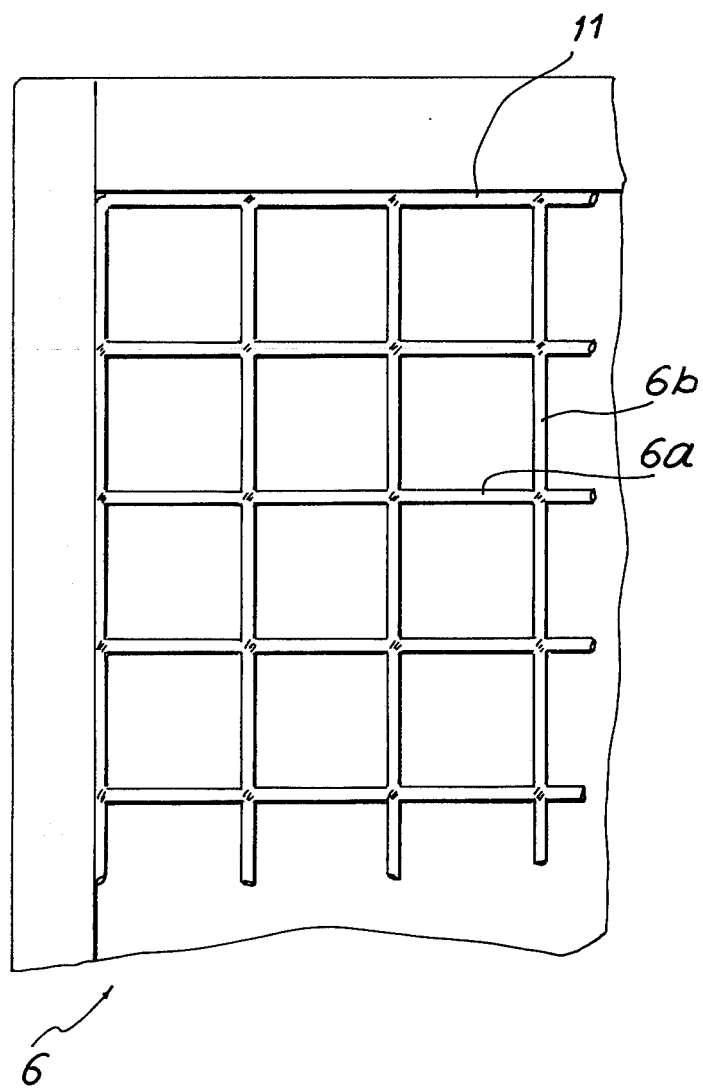
FIG. 2 illustrates an alternative embodiment of the fuel element of FIG. 1.

In the alternative embodiment of FIG. 2, the grid 6 is provided with a framing wire 11 which surrounds said grid on all four sides and has the same composition and diameter as the wires 6a and 6b of the grid itself. Said framing wire 11 is welded to the wires 6a and 6b as well as to the side plates 4a and 4b and to the end plates 4c and 4d.

One of the most attractive industrial applications of the thin fuel element in accordance with the invention lies in the possibility of converting the core of an existing pool reactor by fitting it with fuel element plates of low enrichment. In fact, in order to establish a neutron balance in the core of a reactor of this type, there are four essential factors to be taken into consideration and these are respectively as follows:

a moderating ratio equal to the ratio of the volume of moderator (water) to the volume of fuel;

a fuel enrichment which can attain 93% in U-235 in pool-type reactors of conventional design;

the mass of U-235 within the reactor core;

the available reactivity which represents the capacity of the reactor for irradiation of materials.

Figure 3:
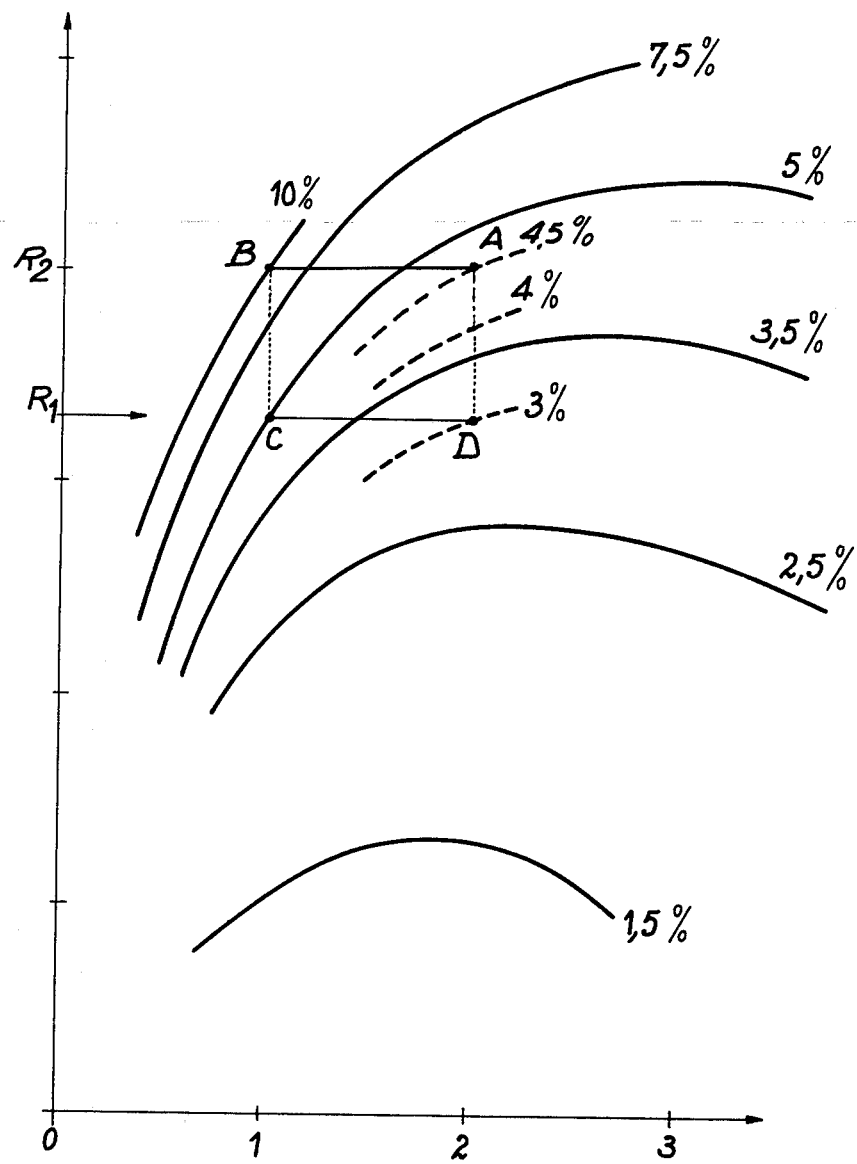
FIG. 3 is a graphical representation in which the set of curves show in respect of different values of enrichment in U-235 the variations in reactivity of a pool-type nuclear reactor core as a function of the moderating ratio.

The ratios between the four parameters given above, two of which are related to each other (mass of uranium and enrichment) are illustrated by the set of curves of FIG. 3 which shows the variation of reactivity in respect of a certain number of enrichments respectively equal to 1.5%, 2.5%, 3%, 4%, 5%, 7.5% and 10%, as a function of the moderating ratio which is plotted as abscissae. The general shape of these curves (increasing function which passes through a maximum and then decreases) indicates that the moderating ratio must be placed in the vicinity of a value at least equal to 2 in order to derive maximum benefit from the core reactivity.

In the case of the fuel elements commonly employed up to the present time in pool reactors (platetype elements of aluminum-uranium alloy enriched with 93% U-235), the moderating ratio usually adopted is in the vicinity of 2 as mentioned above.

If plate fuel elements are replaced in a reactor of this type by plate elements of the fuel wafer type of relatively substantial thickness (4 to 5 mm, for example), it is possible in such a case:

either to retain substantially the same number of plate elements within the internal space provided for the reactor core, thus resulting in a reduction of the moderating ratio and entailing the need for much higher enrichment in order to maintain the same reactivity, or to reduce the number of plate elements in order to retain the same moderating ratio, in which case the power level of the reactor core is also reduced.

On the contrary, by making use of fuel elements in the form of thin plates which is made possible by the present invention, the number of plates can be increased while retaining a moderating ratio which is very close to 2 and consequently permitting a relatively low fuel enrichment in order to maintain a substantially identical power level in the pool-type reactor core.

Referring again to FIG. 3, it is apparent, for example, that a reactor which is made up of plates of substantial thickness, which permits a moderating ratio of the order of 1, which is charged at an enrichment of 10% U-235 and discharged at 5% residual U-235 (path BC), operates with the same reserve of reactivity as a core which permits a moderating ratio of 2, which is charged at 4.5% U-235 and discharged at 3% U-235 (path AD).

What we claim is:

1. A plate-type nuclear fuel element of the type comprising a fuel core constituted by a plurality of ceramic fuel wafers fitted in juxtaposed relation within a frame, each fuel wafer being provided with a metallic protective covering and placed between two metallic cladding plates, wherein a lateral covering is provided for each fuel wafer by means of a grid of thin wires fitted within the frame and each mesh of said grid has the shape and dimensions of a fuel wafer in order to serve as a housing for one of said wafers.

2. A fuel element according to claim 1, wherein the grid is made up of thin wires of a metal selected from the group comprising Zircaloy, aluminum and the aluminum alloys, said wires being joined together by electric welding and diffusion-bonded to the side plates which constitute the frame.

3. A fuel element according to claim 1, wherein the grid is surrounded on all four sides by a framing wire which is welded to the grid wires as well as to the side and end plates.

4. A fuel element according to claim 2, wherein the shape chosen for the grid meshes is reactangular.

5. A fuel element according to claim 2, wherein the wires constituting the grid have a circular section and a diameter of less than 2 millimeters.

6. A fuel element according to claim 2, wherein the shape chosen for the grid meshes is square.

* * * * *